United States Patent [19]

Tomm et al.

[11] Patent Number: 4,643,288

[45] Date of Patent: Feb. 17, 1987

[54] CLUTCH DISC

[75] Inventors: Dagwin Tomm, Kaiserslautern; Franz Hartig, Dittelbrunn, both of Fed. Rep. of Germany

[73] Assignee: Fichtel & Sachs AG, Schweinfurt, Fed. Rep. of Germany

[21] Appl. No.: 728,592

[22] Filed: Apr. 29, 1985

[30] Foreign Application Priority Data

Apr. 28, 1984 [DE] Fed. Rep. of Germany ....... 3415927

[51] Int. Cl.$^4$ ............................................... F16D 3/14
[52] U.S. Cl. ............................. 192/106.2; 192/70.17; 464/68
[58] Field of Search ............... 192/106.1, 106.2, 70.17; 464/68

[56] References Cited

U.S. PATENT DOCUMENTS

| | | | |
|---|---|---|---|
| 1,830,746 | 11/1931 | Ahlene et al. | 464/68 |
| 2,097,627 | 11/1937 | Lewis | 192/106.2 |
| 4,188,805 | 2/1980 | Fall et al. | 192/106.2 |
| 4,433,770 | 2/1984 | Loizeau et al. | 192/106.2 |
| 4,467,905 | 8/1984 | Takeuchi | 192/106.2 |
| 4,493,673 | 1/1985 | Anders et al. | 192/106.2 |
| 4,548,310 | 10/1985 | Maucher | 192/106.2 |

FOREIGN PATENT DOCUMENTS 2508878 3/1984 Fed. Rep. of Germany .

Primary Examiner—Leslie A. Braun
Assistant Examiner—Martin G. Belisario
Attorney, Agent, or Firm—Toren, McGeady and Goldberg

[57] ABSTRACT

The clutch disc for a motor vehicle friction disc clutch comprises a hub part from which a hub flange provided with radially outwardly protruding teeth protrudes radially. A disc part provided with clutch friction linings which comprises an annular disc provided with radially inwardly protruding teeth is mounted rotatably on the hub part. The teeth of the hub flange and the annular disc engage in one another with play in the circumferential direction. The annular disc and the hub flange comprise at least one pair of mutually radially opposite apertures each having two stop faces directed towards one another in the circumferential direction. The stop faces, preferably of the annular disc extend over substantially the entire radial height of a spring arranged in the aperture of this part. The spring is supported on the stop faces of the other part through a retaining stirrup piece which is U-shaped seen in the circumferential direction. The retaining stirrup piece has legs on both axial sides which hold the spring in the circumferential direction between them. The spring couples the annular disc rotationally elastically with the hub disc in idling operation.

11 Claims, 3 Drawing Figures

CLUTCH DISC

BACKGROUND OF THE INVENTION

The invention relates to a clutch disc for a motor vehicle friction disc clutch.

From German Patent No. 25 08 878 a clutch disc for a motor vehicle friction disc clutch is known in which a disc part carrying the clutch friction linings is mounted rotatably, with limited play in rotation, on a hub part. On a hub flange protruding radially from the hub part an external toothing is provided in which an internal toothing of an annular disc of the disc part engages. The hub flange and the annular disc have apertures radially facing one another in which springs are seated which couple the disc part and the hub part rotationally elastically with one another.

In the known clutch disc the abutment faces of the hub flange and of the annular disc act radially offset in relation to one another upon the springs. Thus the springs are eccentrically loaded and thus stressed to an increased extent.

Accordingly the present invention is directed toward provision of a clutch disc for a motor vehicle friction disc clutch in which a disc part carrying the clutch friction linings is coupled rotationally elastically through at least one spring with a hub part, the spring being loaded, in a constructionally simple manner, symmetrically in relation to its end face facing in the circumferential direction of the disc part and/or the hub part.

SUMMARY OF THE INVENTION

In the clutch disc according to the invention an annular disc of the disc part carrying the clutch friction linings is coupled through a toothing with a predetermined play in rotation, but otherwise non-rotatably with a hub flange of the hub part. In the hub flange or preferably in the annular disc at least one aperture is provided which encloses a spring, especially a helical compression spring. The aperture forms first stop faces facing one another, on which the spring is supported directly. These first stop faces extend substantially over the entire radial height of the spring, so that the spring is loaded symmetrically by the first stop faces. The spring is supported on the other part in each case, that is preferably the hub flange, through a retaining stirrup piece. This other part is provided for this purpose with second stop faces facing one another in the circumferential direction. The retaining stirrup piece has a U-shaped cross-section seen in the circumferential direction and preferably lies with the end faces of its cross-piece, placed in the circumferential direction, against the second stop faces. The legs of the retaining stirrup piece surround the part forming the first stop faces, that is preferably the annular disc, on both axial sides and guide the retaining stirrup piece on the annular disc. The spring is seated in apertures of the two legs between stop faces of the legs facing one another in the circumferential direction, and thus is symmetrically stressed by the retaining stirrup piece.

The retaining stirrup piece is preferably supported on the hub flange in the circumferential direction. In this way the hub flange and its toothing can be of axially wider dimensions than the annular disc. Moreover the teeth of the hub flange, despite their tooth root lying on a comparatively small diameter, can be dimensioned for the transmission of a higher torque and at the same time utilized for supporting the legs of the retaining stirrup piece.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
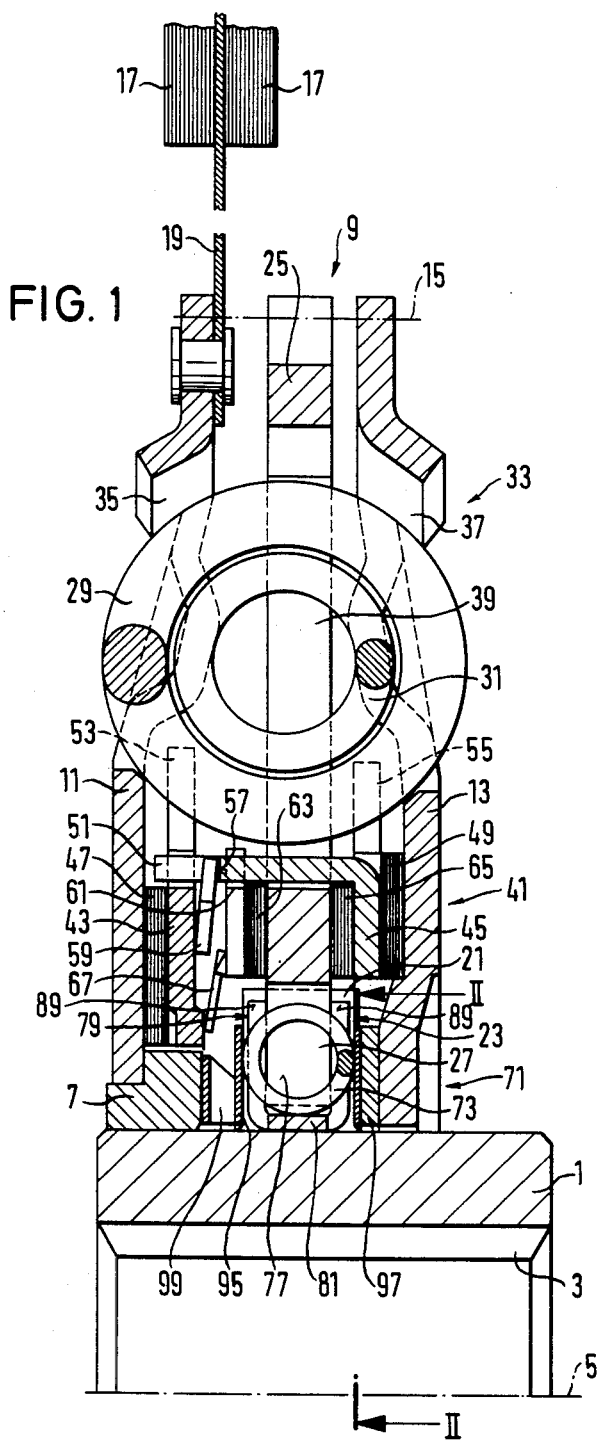
FIG. 1 is an axial longitudinal sectional view through the upper half of a clutch disc for a motor vehicle friction disc clutch.

The clutch disc as represented in FIG. 1 comprises a hub 1 which is couplable non-rotatably but axially displaceably through an internal toothing 3 with a motor vehicle gear input shaft (not represented further) which rotates about a rotation axis 5. A disc part 9 is mounted rotatably through a limited angle of rotation on the hub 1 through a collar 7. The disc part 9 comprises two side discs 11, 13 which, as indicated by a dot-and-dash line at 15, are connected with one another into one unit for example through distance rivets or the like. A friction lining carrier 19 provided with clutch friction linings 17 is riveted to the side disc 11 which is supported on the collar 7.

Teeth 21 of a hub flange 23 protrude radially from the hub 1 axially between the two side discs 11, 13. The annular flange 23 is enclosed by an annular disc 25 from the internal circumference of which teeth 27 protrude radially inwards and couple the annular disc 25 non-rotatably but with predetermined play in rotation with the hub flange 23 of the hub 1. The angle of rotation of the disc part 9 in relation to the annular disc 25 is likewise limited, in a manner not further illustrated, so that the total angle of rotation of the disc part 9 in relation to the hub 1 is limited.

The disc part 9 is coupled rotationally elastically with the annular disc 25 through springs 29, 31, for example helical compression springs of a torsional vibration damper dimensioned for operation under load. The springs 29, 31 are seated conventionally in windows 35, 37 of the side discs 11, 13 for the one part and windows 39 of the annular disc 25 for the other part. Although FIG. 1 shows only one set of springs, several such springs are however provided in distribution in the circumferential direction.

The under-load vibration damper 33 comprises a friction damper 41 with a control disc 43 axially between the side disc 11 and the annular disc 25 and a control disc 45 axially between the side disc 13 and the annular disc 25. A friction ring 47 is arranged axially between the control disc 43 and the side disc 11. Correspondingly a friction ring 49 is seated axially between the control disc 45 and the side disc 13. The control disc 45 is coupled non-rotatably with the control disc 43 through axially bent-over tabs 51. The tabs 51 pass through apertures of the annular disc 25, preferably through extensions of the windows 39. The control discs 43, 45 are conventionally coupled with the springs 29 through arms 53, 55. The arms 53, 55 define the working angle of the friction damper. A dished spring 59 braced in axially between the control disc 43 and stop faces 57 of the tabs 51 braces the control discs 43, 45 by means of the friction linings 47, 49 against the side discs 11, 13.

The under-load friction damper 41 comprises a second friction stage having a thrust disc 61 coupled non-rotatably but axially displaceably with the tabs 51 axially between the dished spring 59 and the annular disc 25, a friction ring 63 axially between the thrust disc 61 and the annular disc 25 and a friction ring 65 axially between the control disc 45 and the annular disc 25. A dished spring 67 braced axially in between the thrust disc 61 and the control disc 43 on the one hand generates the friction force of this second friction stage and on the other hand increases the friction force of the first friction stage. By suitable dimensioning of the control discs 43, 45 and the windows 35, 37 and 39 it is possible to achieve the object that the friction stages come into use for different relative angles of rotation of the disc part 9 and of the annular disc 25.

Figure 2:
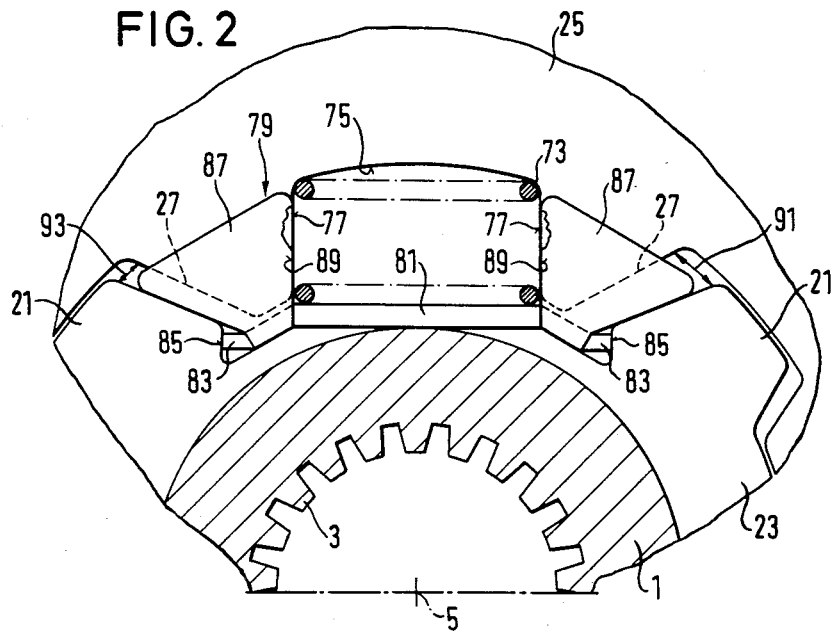
FIG. 2 is a partial axial cross-sectional view through the clutch disc according to FIG. 1, seen along a line II—II.

The annular disc 25 is coupled rotationally elastically with the hub 1 through an idling vibration damper 71 arranged in the region of the teeth 21, 27. The vibration damper 71 comprises at least one, preferably several, helical compression springs 73 offset in relation to one another in the circumferential direction, which as shown best by FIG. 2 are seated in an aperture 75 formed by two adjacent teeth 27 of the annular disc 25. The teeth 27 limit the aperture 75 by two stop faces 77 facing one another in the circumferential direction, which extend substantially over the whole radial height of the end faces of the helical compression spring 73 and symmetrically load the end faces.

The spring 73 is supported through a retaining stirrup piece 79 on the hub flange 23 and thus the hub 1. The retaining stirrup piece 79 has a cross-piece 81 elongated in the circumferential direction which is supported in the circumferential direction with its ends 83 on stop faces 85 facing one another in the circumferential direction between two teeth 21 of the hub flange 23. Two leg tabs 87 are formed axially on each of the two sides of the annular disc 25 in the region of the ends 83 on the cross-piece 81. The leg tabs 87 enclose the annular disc 25 between them and guide the retaining stirrup piece 79 axially on the annular disc 25. The leg tabs 87 form stop faces 89 which retain the spring 73 symmetrically between them.

The axial width of the teeth 21 of the hub flange 23 is wider than the annular disc 25 by at least twice the axial thickness of the leg tabs 87. The leg tabs 87 are shaped so that they are supported flat upon the adjacent teeth 21 in the circumferential direction. While the cross-piece 81 of the retaining stirrup piece 79 is flat in the region of the spring 73 and extends parallel to the rotation axis 5, in the region of the leg tabs 87 it is bent with a curvature around the hub 1. The ends 83 are bent off oppositely so that they abut with their end edges on the approximately parallel-extending stop faces 85.

The spring 73 holds the annular disc 25 in a rest position out of which it can be turned in relation to the hub 1 in both directions of rotation against the force of the spring 73. In the present example of embodiment the play in rotation, as indicated by arrows 91, 93, is of unequal sizes for the two directions of rotation. After the play in rotation 91 or 93 has been taken up, the annular disc is coupled non-rotatably with the hub 1.

As FIG. 1 shows, the idling vibration damper 71 comprises a friction damper with a friction ring 95 arranged axially between the hub flange 23 and the side disc 11 and a further friction ring 97 axially between the hub flange 23 and the side disc 13. The friction force is generated by means of an axially acting spring 99, here a corrugated spring, which is braced in between the friction ring 95 and the collar 7 supported on the side disc 11.

Figure 3:
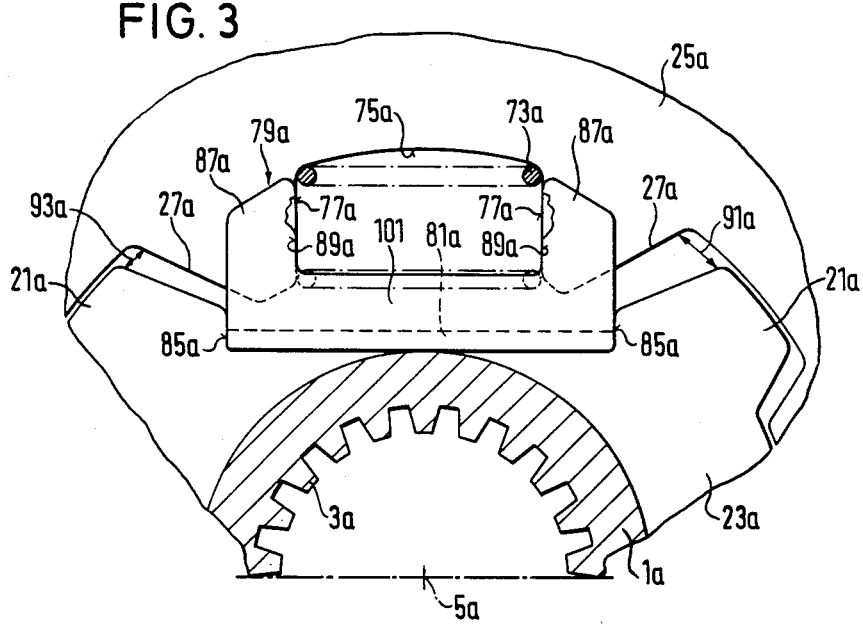
FIG. 3 is a partial axial cross-sectional view similar to FIG. 2 through a variant of a clutch disc similar to the clutch disc according to FIG. 1.

FIG. 3 shows details of an idling vibration damper for a clutch disc of the kind as described with reference to FIG. 1, which differs from the clutch disc according to FIG. 1 substantially only in the configuration of the retaining stirrup piece. Parts of like effect of the vibration damper according to FIG. 3 are therefore designated by the reference numerals of FIGS. 1 and 2 and provided with the letter a for distinction. For the explanation of the assembly and manner of operation reference is made to the description of FIGS. 1 and 2.

In contrast to the retaining stirrup piece 79, the retaining stirrup piece 79a has a cross-piece 81a which is flat over its entire length extending in the circumferential direction, and the stop faces 89a of its four leg tabs 87a do not reach to the cross-piece 81a. In the circumferential direction between the leg tabs 87a the leg tabs 87a are connected with one another by leg walls 101 which stiffen the cross-piece 81a and thus the retaining stirrup piece 79a. In this embodiment it is sufficient if the retaining stirrup piece 79a is supported in the circumferential direction on the support faces 85a only in the region of the cross-piece ends. Furthermore the leg walls 101 guide the spring 73a radially in the radially inwardly open aperture 75a.

In the examples of embodiment according to FIGS. 1 to 3 the retaining stirrup pieces are guided on the hub flange. Alternatively the spring can be inserted into an aperture of the hub flange while the retaining stirrup piece is supported in the circumferential direction on the annular disc. Centrifugal forces occurring in operation in this case hold the retaining stirrup piece on the annular disc. As an alternative to the examples of embodiment as described the play of the annular disc in rotation can also be of equal sizes for both directions of rotation.

While specific embodiments of the invention have been shown and described in detail to illustrate lo the application of the inventive principles, it will be understood that the invention may be embodied otherwise without departing from such principles.

What is claimed is:

1. A clutch disc for a motor vehicle friction disc clutch, comprising:
   (a) a hub part rotatable about an axis having radially a extending hub flange provided with radially outwardly protruding teeth,
   (b) a disc part mounted rotatably on the hub part and provided with clutch friction linings, said disc part comprising an annular disc provided with radially inwardly protruding teeth engaging with limited rotational play in the circumferential direction the teeth of the hub flange, wherein the hub flange teeth are in a radial overlapping relationship with said annular disc teeth.

(c) at least one pair of first stop faces, directed towards one another in the circumferential direction, being located on each of the annular disc and the hub flange, (d) a spring being elastically stressable by the relative rotation of the annular disc and of the hub flange and said spring positioned radially outwardly from the hub part axis, the spring arranged between the first stop face pairs of each of the annular disc and of the hub flange, a first pair of said first stop faces pairs formed either of the teeth of the annular disc or of the teeth of the hub disc and extending substantially over the entire radial height of the spring and (e) a retaining stirrup piece forming a second pair of said pairs of first stop faces, said stirrup piece being U-shaped as seen in the circumferential direction and having legs extending in the circumferential direction with edges thereof extending in the axial direction of said hub part and forming the second pair of said first stop faces, said legs being spaced apart for and holding the spring therebetween in the circumferential direction and the second pair of said first stop faces extending substantially over the entire radial height of the spring, said retaining stirrup piece comprising a cross-piece extending in the circumferential direction between the second pair of said stop faces and connecting the legs with one another.

2. A clutch disc according to claim 1, wherein the first pair of first stop faces is provided on the annular disc and the second pair of first stop faces is provided on said retaining stirrup piece supported on the hub flange.

3. A clutch disc according to claim 2, wherein the dimension of the teeth of the hub flange in the axial direction of the hub part is greater than the dimension of the teeth of the annular disc in the axial direction of the hub part.

4. A clutch disc according to claim 3, wherein said legs of said stirrup piece arranged in pairs with the spring located between the pairs and the spacing in the axial direction of the hub part between the legs of each pair of the retaining stirrup piece is less.than the dimension of the teeth of the hub flange in the axial direction of the hub part.

5. A clutch disc according to claim 4, wherein the edges of the legs, facing away from one another in the circumferential direction, are adapted to the contour of the teeth of the hub flange.

6. A clutch disc according to claim 2, wherein the legs guide the retaining stirrup piece movably on the annular disc in the circumferential direction.

7. A clutch disc according to claim 2, wherein the cross-piece abuts with its end edges placed in the circumferential direction, upon one of said pairs of said first stop faces.

8. A clutch disc according to claim 1, wherein each of the two legs comprises two leg tabs arranged with spacing from one another in the circumferential direction, which form an aperture open on the side radially remote from the cross-piece, in which they enclose the spring between them.

9. A clutch disc according to claim 8, wherein the aperture between the leg tabs reaches to the cross-piece and the cross-piece is bent, at least in the region of the transition from the aperture into the leg tabs, approximately to follow the curvature of the hub part.

10. A clutch disc according to claim 8, wherein the two leg tabs of each leg are connected with one another by a leg region which stiffens the cross-piece and limits the aperture.

11. A clutch disc according to claim 8, wherein the cross-piece, seen in the circumferential direction, is flat at least in the region between the two leg tabs and extends parallel to the rotation axis of the clutch disc.

* * * * *